United States Patent
Bollmann et al.

(10) Patent No.: US 9,313,842 B2
(45) Date of Patent: Apr. 12, 2016

(54) LED LIGHTING CONTROLLER

(71) Applicant: RINGDALE, INC., Georgetown, TX (US)

(72) Inventors: Klaus Bollmann, Georgetown, TX (US); Tom C. Penick, Leander, TX (US)

(73) Assignee: Ringdale, Inc., Georgetown, TX (US)

(*) Notice: Subject to any disclaimer, the term of this patent is extended or adjusted under 35 U.S.C. 154(b) by 0 days.

(21) Appl. No.: 14/584,159

(22) Filed: Dec. 29, 2014

(65) Prior Publication Data

US 2015/0108905 A1 Apr. 23, 2015

Related U.S. Application Data

(63) Continuation of application No. 13/946,653, filed on Jul. 19, 2013, and a continuation of application No. 12/621,484, filed on Nov. 18, 2009, now Pat. No. 8,922,058.

(60) Provisional application No. 61/115,739, filed on Nov. 18, 2008.

(51) Int. Cl.
*H02J 9/00* (2006.01)
*H05B 33/08* (2006.01)
*H05B 37/02* (2006.01)

(52) U.S. Cl.
CPC .......... *H05B 33/0815* (2013.01); *H05B 33/089* (2013.01); *H05B 33/0845* (2013.01); *H05B 33/0854* (2013.01); *H05B 33/0863* (2013.01); *H05B 37/0254* (2013.01); *H02J 9/005* (2013.01); *Y10T 307/625* (2015.04)

(58) Field of Classification Search
CPC ........ H02J 9/062; H02J 9/061; G02B 6/0068; H05B 33/0803
USPC ..................... 307/66; 362/612, 227
See application file for complete search history.

(56) References Cited

U.S. PATENT DOCUMENTS

| | | | | |
|---|---|---|---|---|
| 5,661,645 | A * | 8/1997 | Hochstein | H02J 9/065 363/89 |
| 7,781,982 | B2 * | 8/2010 | Tatsumi | H05B 33/0815 315/224 |
| 7,852,010 | B2 * | 12/2010 | Negley | H05B 33/0827 315/169.3 |
| 7,862,204 | B2 * | 1/2011 | Lodhie | F21K 9/135 362/249.02 |
| 2007/0258266 | A1 * | 11/2007 | Baek et al. | 362/612 |
| 2007/0291483 | A1 * | 12/2007 | Lys | 362/227 |
| 2008/0238340 | A1 * | 10/2008 | Leung | H05B 33/0827 315/297 |

* cited by examiner

*Primary Examiner* — Jared Fureman
*Assistant Examiner* — Alfonso Perez Borroto
(74) *Attorney, Agent, or Firm* — William N. Hulsey, III; Jeffrey D. Hunt; Hulsey Hunt & Parks, P.C.

(57) ABSTRACT

A switch mode power supply controller provides power to a pair of light sources. The controller includes a low voltage programmable current source and adjusting elements for independently adjusting the current to the LED light sources. The controller also includes a first communication port for receiving a communication from an external device, such as a dimmer, or from another power supply controller; and a second communication port for sending a communication to a third power supply controller. These ports provide an upstream and downstream communication capability through a chain of controllers so that input from a device can be communicated upstream and downstream.

6 Claims, 12 Drawing Sheets

LED LIGHTING CONTROLLER

CROSS-REFERENCE TO RELATED APPLICATIONS

This application claims priority to U.S. Provisional Patent Application No. 61/115,739 filed Nov. 18, 2008, U.S. Provisional Patent Application No. 61/123,379 filed Dec. 14, 2008. U.S. Non-Provisional patent application Ser. No. 12/321,484, filed Nov. 18, 2009.

All fore-mentioned applications are hereby incorporated in their entirety.

BACKGROUND OF THE INVENTION

This application is related to LED lighting, and more specifically to a controller for LED lighting.

BACKGROUND—PRIOR ART

All LED lighting has the same requirement and is really not understood by many of the suppliers in the current market. To optimally drive an LED and get the maximum light output per watt over a large temperature range significant electronic trickery must be employed.

Prior art devices use resistors to limit the current, do not monitor the junction temperature of the LED, and take no attention to most details of producing high efficiency lighting.

SUMMARY OF INVENTION

In one embodiment, a switch mode power supply controller provides power to a pair of light sources. The controller includes a low voltage programmable current source and adjusting elements for independently adjusting the current to the LED light sources. The controller also includes a first communication port for receiving a communication from an external device, such as a dimmer, or from another power supply controller; and a second communication port for sending a communication to a third power supply controller. These ports provide an upstream and downstream communication capability through a chain of controllers so that input from a device can be communicated upstream and downstream.

BRIEF DESCRIPTION OF DRAWINGS

FIG. 3 is a schematic of an RFI Filter and Surge/Overcurrent Protection 1100.

FIG. 4 is a schematic of a 85-300 VAC PFC Controller 1200.

FIG. 5 is a schematic of a PFC Secondary 1300.

FIG. 6 is a schematic of 15 Volt buck (SEPIC) Power Supply 1400.

FIG. 7 is a schematic of 15 Volt and 3.3 Volt Switching Power Supplies.

FIG. 8 is a schematic of an LED Drive Circuit.

FIG. 9 is a schematic of Isolated Ground References.

FIG. 10 is a schematic of Communications circuitry.

FIG. 11 is a schematic of Battery Backup and Microcontroller Inputs.

FIG. 12 is a schematic of Microcontroller circuitry.

DESCRIPTION OF EMBODIMENT——LED Controller

Figure 1:
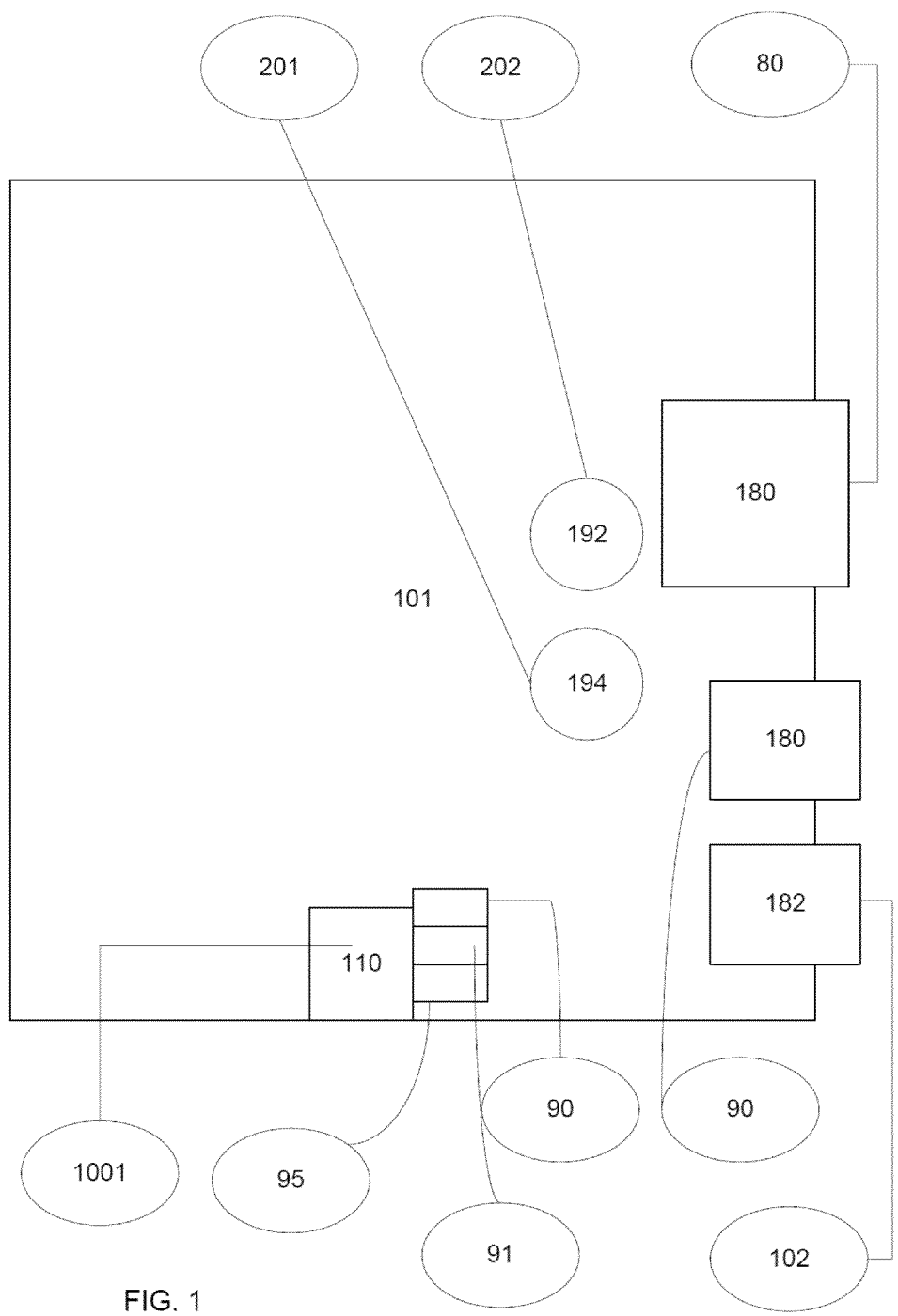
FIG. 1 is a schematic illustrating a portion of the functionality, external inputs, and communication of a controller board.

As we want the flexibility to drive a number of variations of LED Arrangements (i.e. from one to eight elements) and must have the ability to adjust to new technology in elements that may require higher currents or higher voltages and/or lower currents, we require a power source with the following features:

Programmable Current Source

The programmable current source allows the manufacture of one device for a multitude of LED arrangements.

Power Factor Corrected

In one embodiment, a the power factor correction specifically for a particular application, such as street lights allows, much lower capacitor and power factor correction capabilities from the Utility Providers and their sub-stations.

Constant or Pulse Width Modulated

The modulation allows the LED to function at its maximum efficiency in all operating conditions, and elongates the life of the LED element. The pulse width modulation allows the LED to continue to produce light efficiently when being operated at reduced brightness.

Heat Sink Temperature Sensor

This sensor allows the LED to work with maximum efficiency in hot climates like UAE and other equatorial regions. This sensor allows the LED to work with maximum efficiency in hot climates like UAE and other equatorial regions. The LED may be maintained within its rated thermal operating range by dimming the LED when its temperature approaches the upper limit.

Direct Sensor Control

An input at the LED Lighting Supply that connects and powers a Motion or an Occupancy Sensor directly is provided.

Direct Dimmer and On/Off Control

For simple applications, such as one light one switch or one dimmer, the device has a dimmer/switch input powered from the LED Lighting Supply.

Networkable—In—Out (150 feet distance)

One LED Lighting Supply can communicate with two neighbors through a proprietary communication link and protocol. The communication is potential free so that ground loops will not affect communication reliability or cause a danger to installation or maintenance personnel. Communications received on one port are repeated out of the opposite port so that communications can be relayed to multiple units.

Battery Backup

The unit can be used in emergency lighting applications where the unit monitors its supply voltage and switches on the LED when the main power supply fails drawing current from a 48 volt battery pack. When power is restored the light turns off and the battery charger is re-activated. The 48 volt battery is shown as a convenient voltage for a low voltage controller. Other battery voltages may be used.

Power Fail Sensing

A power fail sensor is included but not required to be include for non-battery backed up applications.

DayLight Sensor Input

This option is required for outside lighting.

UL Listed

The device preferably has its own UL listing and can be treated as a low-voltage device on all LED arrangement current outputs as well as on the communication and dimmer inputs.

Double Insulated

While being a double insulated device, it can be used with ANY arrangement and control situation.

Rating Label

UL/CE label of the device is clearly displayed within the requirements of outdoor or indoor lighting fixtures.

Benefits

The LED Lighting Supply of the current invention can be used for Office Lighting, Path Lighting, Street Lighting, Accent Lighting up to 56 Watts or eight (8)×7 watt elements.

The functionality of the various control inputs is described below. In one example, the inputs are 2×EDSaP, 1×Dimmer Control, 1×motion and occupancy, 1×daylight.

Energy Efficiency

This control system provides several approaches to energy efficiency. LED light source efficiency is optimized through the power supply which provides the proper voltage and current to the diode. This power supply is highly efficient in the manner that it provides that current and voltage. The energy efficiency of the controller is 97-98%. This is a dramatic improvement in efficiency. For instance, one prior art device requires a 13 watt input to power a 6 watt LED light source. The system may also include one or more digital dimmer to precisely control the LED light sources at desired times or under desired conditions. This current reduction is achieved with a minimal loss of energy efficiency. In one example, the current may be reduced in 2% increments. Individual controllers within a lighting system can be separately controlled by one or more of dimmers, photosensors, or motion sensor.

Capital and Maintenance Efficiency

The control system also provides advantages in capital efficiency and maintenance efficiency. A common controller design can be used for a variety of incoming voltages, so that the controller may be produced in high volume to reduce cost, and so that further efficiencies may be obtained through the reduction in the number of components. A common device, with a single UL approval is provided, so that there is not an approval delay in providing new applications based on the controller. The number and complexity of auxiliary devices, such as dimmers, is greatly reduced relative to prior art design. For example, in the case of a church, prior art dimmers would typically require multiple synchronized thyristor dimmers; while one embodiment of the current invention could use a single inexpensive digital dimmer to control a plurality of daisy-chained controllers. The capital and installation costs of communications wiring is reduced through the chaining of controllers so that instructions to a first controller may be relayed to downstream controllers.

FIG. 1 is a schematic illustrating a portion of the functionality, external inputs, and communication of a controller board 101. In this example, the controller accepts an incoming power supply (not shown) of approximately 90-300 volts, and provides power to LED light sources 201 and 202. In one example, the supply is rated for 90 to 300 VAC so that it may be used with 120-volt, 208-volt, 240-volt, and 277-volt systems.

Potentiometers

In this embodiment, the power supply is programmable with a first potentiometer 194 for a first LED light source 201; and a second potentiometer 192 for a second LED light source 202. These potentiometers permit an adjustment between 400 mA and 900 mA LED light sources which are common at this time, as well as other types of LED light sources in the future.

Power Supply

In one embodiment, the power supply is a switch mode power supply which is power factor corrected. In one embodiment, the power supply provides approximately 53 volts, which is the voltage associated with a bank of four 12 volt batteries.

The power supply in this embodiment is a low voltage current source power supply that is below the 75 volt threshhold necessary to be designated as low voltage.

In this embodiment, the power supply also has a feature of no exposed terminals. The device is UL Class 2 certifiable as being below 100 watts, below 75 volts, and double insulated.

The power supply accepts an input voltage in the range of 100-277 volts +/−10% and is therefore suitable for worldwide operation including U.S. industrial applications using 277 volts.

Dimmers, Photosensors, and Motion Sensors

The power supply includes two provisions for accepting a signal from an external device such as a dimmer 90 or a photosensor 91.

An individual controller, such as controller 101 has connectors to accept a dimmer 90, such as a potentiometer device; a photosensor 91; and a motion sensor 95 such as a Ringdale Motion Sensor #00-27-16090000.

As discussed more fully below, the power supply may also accept the input of a single dimmer 94, such as a digital device, through the comm 1 port and use that single dimmer to dim all LED light sources associated with a series of controllers.

Comm Ports

In one example, the comm 1 port 180 includes a 15 volt output that can be used to power a dimmer 90, motion sensor, or other external device.

In one example, the dimmer sets a general power level, which may not be required until a motion detector communicates a presence within an area. Thus lights can be sequenced to follow an individual down a hallway.

As described below, the comm 2 port 180 of a first controller 101 may communicate with the comm 1 port of a second controller 102 so that a plurality of units may be daisy-chained together. In one example, 8 controllers are connected in such a manner.

Microcontroller and Programming Port

The controller also includes a programming port for receiving instructions to a microcontroller 120, such as a Ringdale microcontroller. The microcontroller may be programmed with [an external computer 1001 through port 110. Each controller has a unique MAC address, thus it is possible to remotely control each controller device. A second microcontroller Power Supply Controller A power supply controller 130 provides a power factor correction.

Batteries

In this example, a 4-pin battery connector 180 is provided to connect to a bank 80 of four 12 volt batteries. The batteries may be charged or discharged through the connector. The connector includes 4 pins include a positive, negative, and two LED connections. The LED connections include a green LED to indicate fully charged and a red LED to indicate status.

DESCRIPTION OF EMBODIMENT—DAISY CHAINING OF CONTROLLERS

Figure 2:
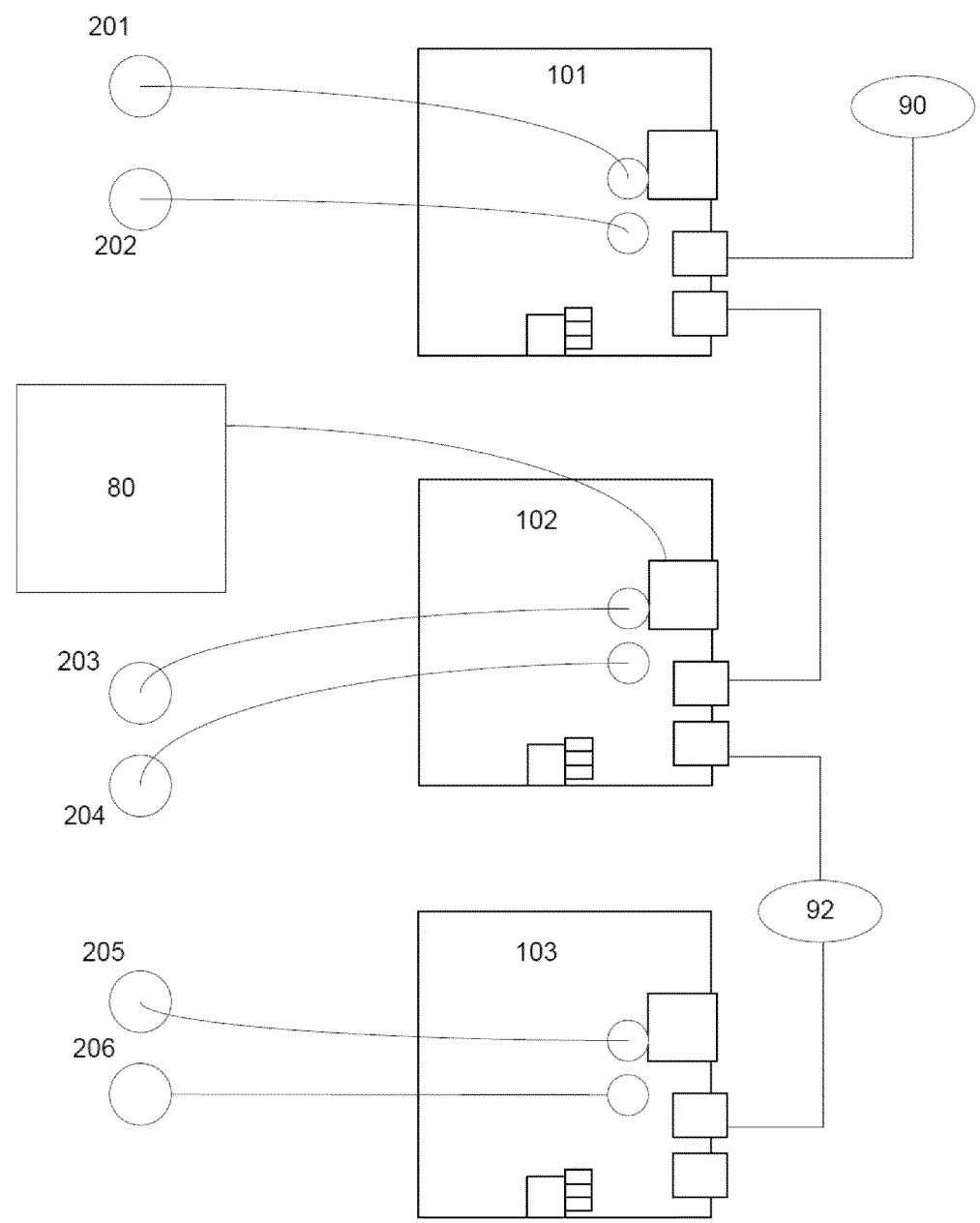
FIG. 2 is a schematic showing three controllers in series.

FIG. 2 is a schematic showing three controllers 101, 102, and 103 in series where controller 101 supplies power to LED light sources 201 and 202; controller 102 supplies power to LED light sources 203 and 204; and controller 103 supplies power to LED light sources 205 and 206.

Each controller includes a first comm port 80 which may accept a signal from a source such as an external device such as an electronic dimmer or a motion sensor;

an ethernet connection; or a wireless adapter such as a Ringdale model no. 00-27-16190000 wireless adapter.

Each controller also includes a second comm port 82, which is typically used to daisy chain a series of controllers together as illustrated in FIG. 2. In this example, comm2 port 82*a* of controller 101 is connected to comm 1 port 80*b* of controller 102; and comm2 port 82*b* of controller 102 is connected to comm 1 port 80*c* of controller 103. This chaining permits a single wired or wireless instruction to be communicated to all of the controllers and reduces communications wiring or complexity. The chaining also permits a single dimmer to direct all controllers 101, 102, and 103.

Each controller may have a dimmer, photosensor, and/or motion sensor that instructs that controller to override the general instructions provided through the daisy chain.

EXAMPLE

FIGS. 3-12 are detailed schematics for an example controller.

Figure 3:
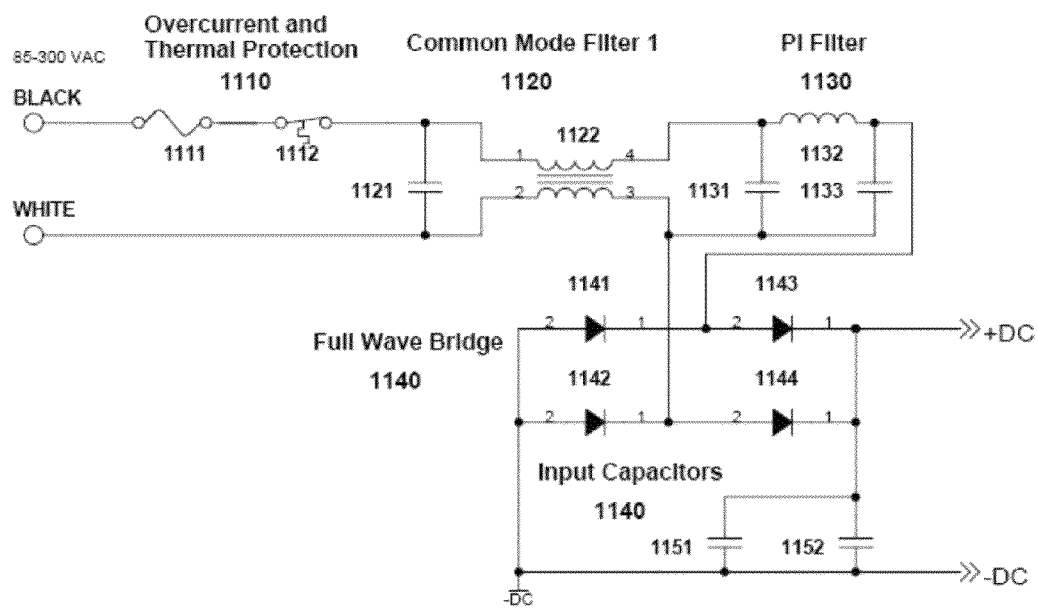
FIGS. 3-12 are detailed schematics for an example controller.

FIG. 3 is a schematic of an RFI Filter and Surge/Overcurrent Protection 1100. This portion of the controller circuitry includes:

Overcurrent and thermal protection 1110 comprising a 2A 350V SMT fuse 1111; and a 155-165° F., 30° F. diff thermal protection element 1112;

Common Mode Filter 1 1120 comprising a 0.1 µF capacitor 1121; and a 5.5 mH inductor 1122;

PI Filter 1130 comprising 0.1 µF capacitors 1131 and 1133; and a 470 µH inductor 1132;

A Full Wave Bridge 1140 comprising diodes 1141, 1142, 1143, and 1144; and Input capacitors 1150 comprising 0.1 µF capacitors 1151 and 1152.

Figure 4:
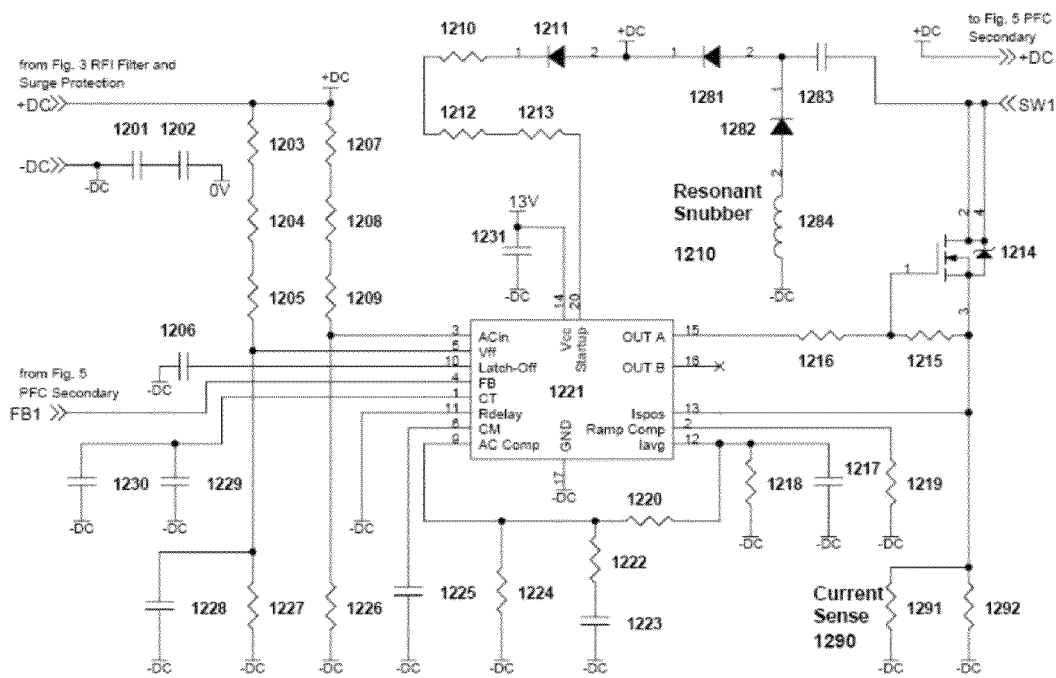

FIG. 4 is a schematic of a 85-300 VAC PFC Controller 1200. This portion of the controller circuitry includes:

2200 pF capacitors 1201 and 1202;
249 K resistors 1203, 1204, 1205, 1207, 1208, and 1209;
0.001 µF capacitor 1206;
2.49 K resistors 1210, 1212 and 1213;
1000V diode 1211;
mosfet transistor 1214;
22.1 K resistor 1215;
10 Ohm resistor 1216;
330 pF capacitor 1217;
82 K resistor 1218;
33 K resistor 1219;
1 M resistor 1220;
power supply controller with power factor correction 1221;
130 Ohm resistor 1222;
0.33 µF capacitor 1223;
300 K resistor 1224;
1 nF capacitor 1225;
8.87 K resistor 1226;
10 K resistor 1227;
2.2 µF capacitor 1228;
220 pF capacitor 1229;
330 pF capacitor 1230;
0.1 µF capacitor 1231;
Resonant Snubber 1280 comprising 1000V diodes 1281 and 1282; 470 pF capacitor 1283; and 470 pH inductor 1284; and Current Sense 1290 comprising resistors 1291 and 1292.

Figure 5:
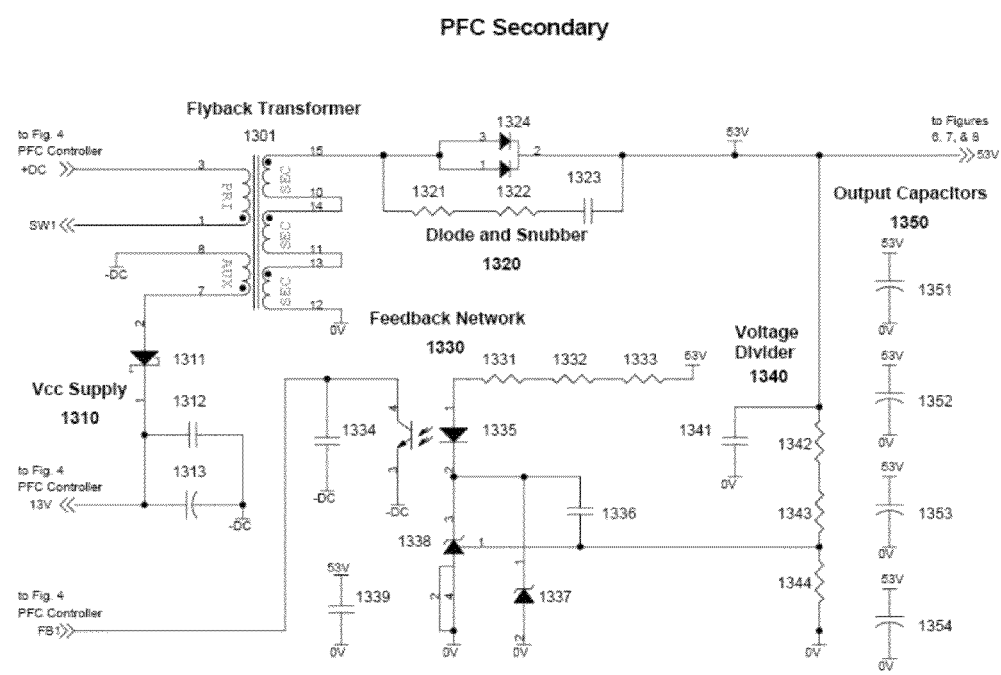

FIG. 5 is a schematic of a PFC Secondary 1300. This portion of the controller circuitry includes:

a 270 µH 6.8:1>90 W 3000V flyback transformer 1301;
a Vcc Supply 1310 comprising a diode 1311; 1 µF capacitor 1312; and 150 µF 35V 555 mA electrolytic capacitor 1313;

A Diode and Snubber 1320 comprising 33 Ohm resistors 1321 and 1322; 220 pF capacitor 1323; and 400V 16 A diode 1324;

a feedback network 1330 comprising 33*k* resistors 1331, 1332, and 1333; 0.22 µF capacitor 1334; 80V ??? 1335; 4700 pF capacitor 1336; 30V 500 mW Xenor diode 1337; 2.495/36V optoisolator 1338; and 0.1 µF capacitor 1339;

Voltage Zdivider 1340 comprising capacitor 1341; 90.9 K resistor 1342; resistor 1343; and 4.99 K resistor 1344; and Output Capacitors 1350 comprising 470 µF 100V capacitors 1351, 1352, 1353, and 1354.

Figure 6:
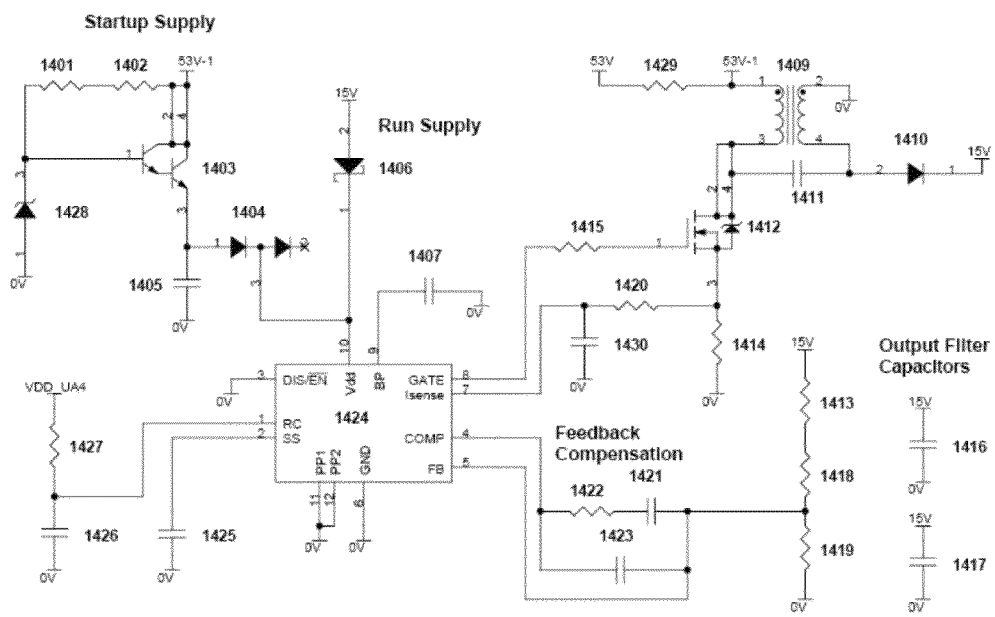
Figure 7:
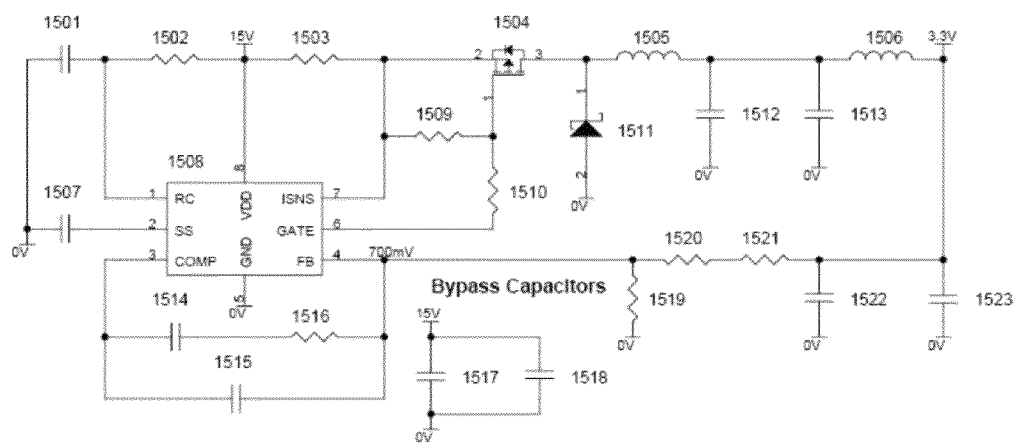

FIG. 6 is a schematic of 15 Volt buck (SEPIC) Power Supply 1400. This portion of the controller circuitry includes:

30.1 K resistors 1401 and 1402;
100V 1.5 A Darlington transistor 1403;
100V 215 mA 1.5 pF 1404;
0.1 µF capacitor 1405;
3 A 30V diode 1406;
1 µF capacitor 1407;
49.9 ohm resistor 1408;
dual inductor 1409;
1 A 200V diode 1410;
0.47 µF capacitor 1411;
100V 3.7 A 12 ohm 632 pF transistor 1412;
49.4 ohm resistors 1413, 1418;
1 ohm resistors 1414, 1415;
2.2 µF capacitors 1416, 1417;
2.43 k resistor 1419;
4700 pF capacitor 1421;
36.5 k resistor 1422;
1 k resistor 1420;
220 pF capacitor 1430;
power supply controller 1424;
13V 500 mw diode 1428;
zero ohm resistor 1429;
47 pF capacitor 1423;
0.1 µF capacitor 1425;
470 pF capacitor 1426;
470 k resistor 1427;

FIG. 7 is a schematic of 15 Volt and 3.3 Volt Switching Power Supplies 1500. This portion of the controller circuitry includes:

330 pF capacitor 1501;
100 k resistor 1502;
1 ohm resistor 1503;
transistor 1504;
inductor 1505, 1506;
1 µF capacitor 1507;
controller 1508;
10 k resistor 1509;
49.9 ohm resistor 1510;
3 A 40V diode 1511;
2.2 µF capacitor 1512, 1513, and 1523;
2200 pF capacitor 1514;
diode 1515;
160 k resistor 1516;
2.43 k resistor 1519;
221 ohm resistor 1520;
8.87 k resistor 1521; and
0.1 µF capacitor 1522, 1518, 1517.

Figure 8:
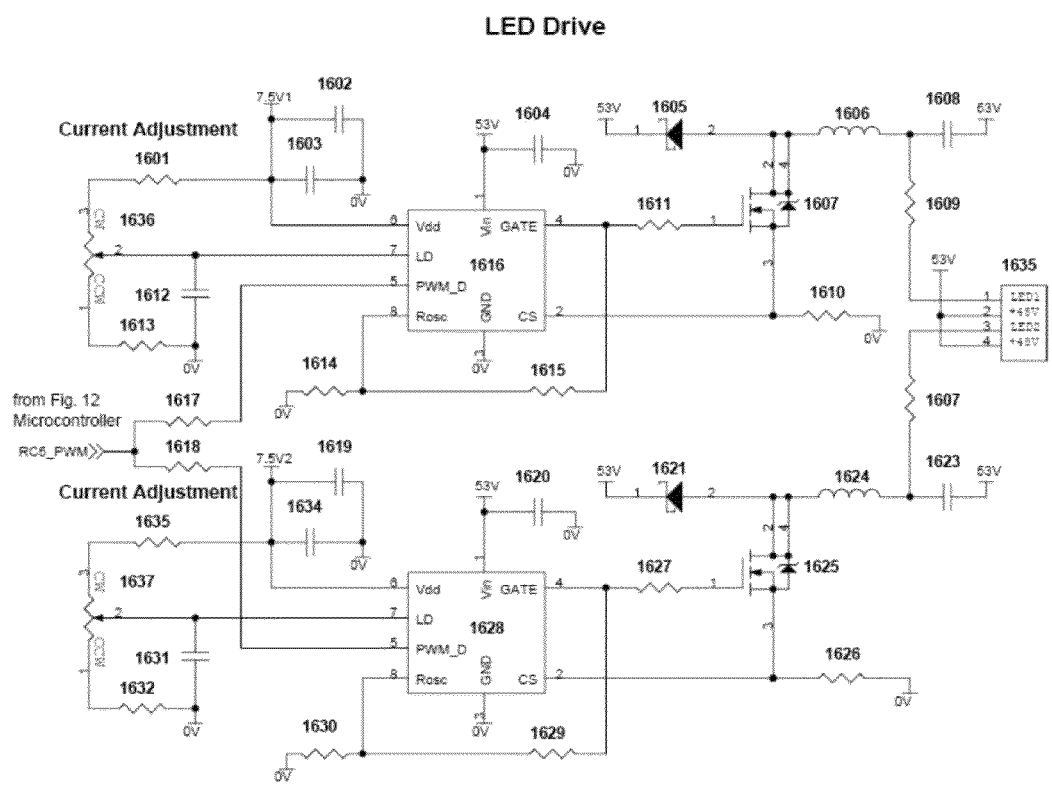

FIG. 8 is a schematic of an LED Drive Circuit 1600. This portion of the controller circuitry includes:
470 k resistor 1601;
1 µF capacitor 1602 1619;
0.1 µF capacitor 1603, 1604;
3 A diode 1605;
inductor 1606;
transistor 1607;
0.47 µF capacitor 1608, 1623;
zero ohm resistor 1609, 1622;
274 ohm resistor 1610;
10 ohm resistor 1611, 1627;
2.2 µF capacitor 1612, 1631;
6.98 k resistor 1613, 1632;
resistor 1614;
49.9 k resistor 1615, 1629;
controller 1616;
1 k resistors 1617,1618;
0.1 µF capacitor 1620, 1634;
transistor 1625;
resistor 1626, 1630;
controller 1628;
470 k resistor 1633, and
connector 1635.

Figure 9:
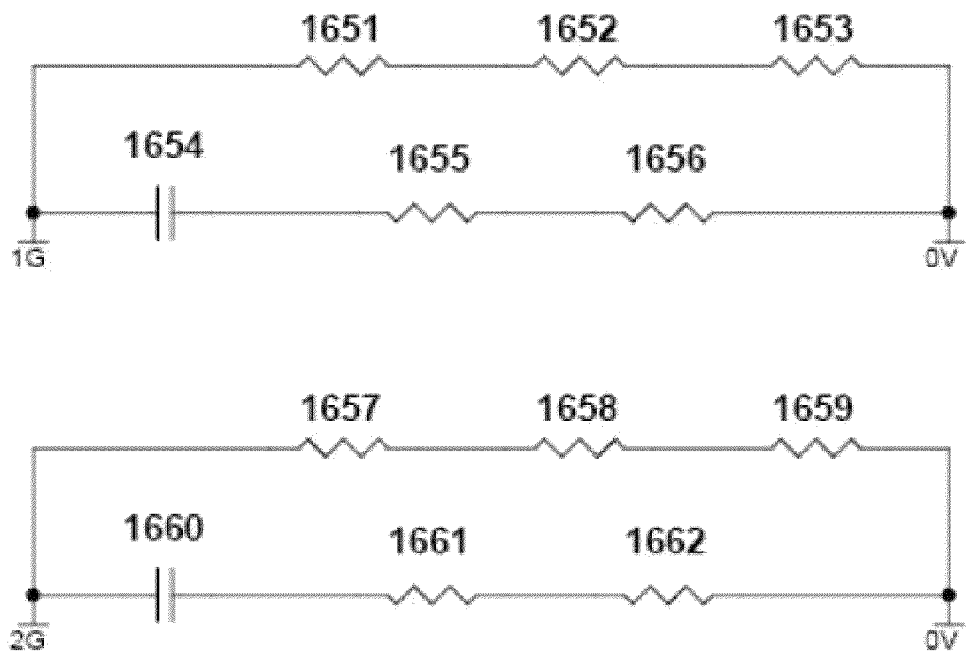

FIG. 9 is a schematic of Isolated Ground References 1650. This portion of the controller circuitry includes:
330 k resistors 1651, 1652, 1653, 1657, 1658, 1659;
7.5 k resistors 1655, 1656, 1661, 1662; and
0.1 µF capacitor 1654, 1660.

Figure 10:
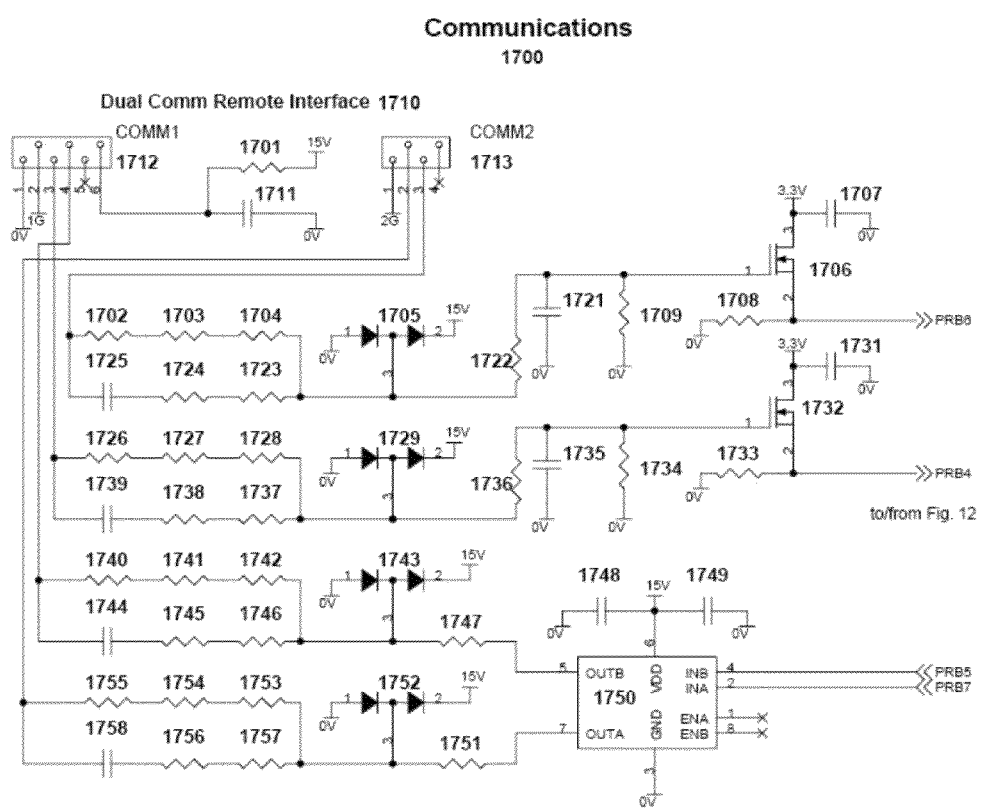

FIG. 10 is a schematic of Communications circuitry.
This portion of the controller circuitry includes:
a Dual Comm Remote Interface 1710 comprising connectors 1712 and 1713; and
processor 1750.

Figure 11:
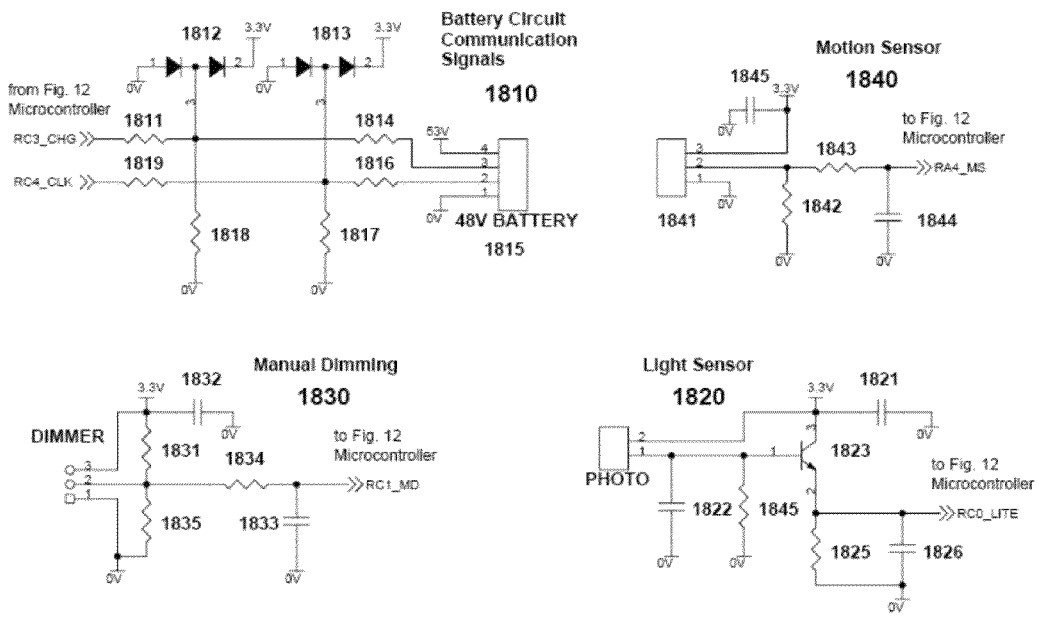

FIG. 11 is a schematic of Battery Backup and Microcontroller Inputs 1800. This portion of the controller circuitry includes:
Battery Backup and Microcontroller Inputs 1810;
Light Sensor circuit 1820;
Manual Dimming circuit 1830; and
Motion sensor circuit 1840.

Figure 12:
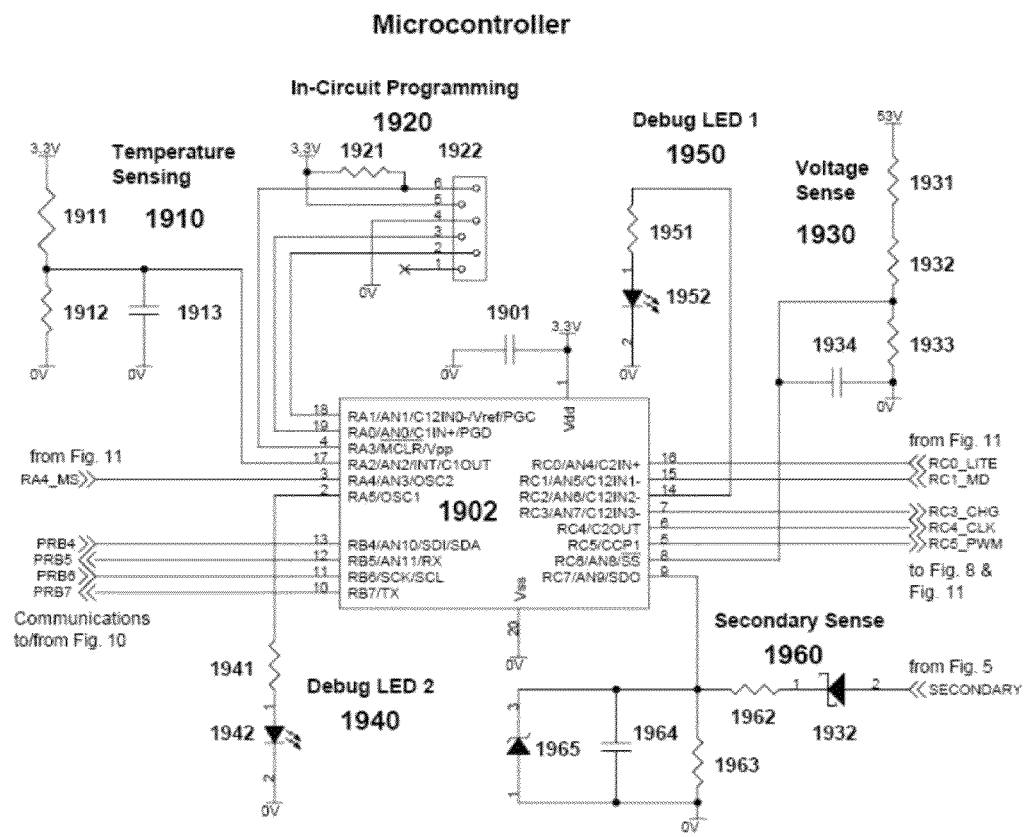

FIG. 12 is a schematic of Microcontroller circuitry 1900. This portion of the controller circuitry includes:
temperature sensing 1910;
in-circuit programming 1920;
voltage sensing 1930;
Debug LED1 1950;
Debug LED2 1940; and
Secondary Sense 1960.

The current invention is not limited to the specific embodiments and examples described above.

What is claimed is:

1. A method of establishing and maintaining a constant LED output of plurality of series connected LED power supplies, the method comprising:
receiving a communication from an external device via a first communication port;
adjusting via an adjusting element the current from a first switch mode power supply controller to at least one LED light source comprising at least one diode, wherein the adjusting element fixes the current at a level for producing a predefined brightness from said at least one LED light source; and
relaying the communication via a second communication port to a second switch mode power supply controller and outputting an essentially constant light level output across a system of switch mode power supply controllers connected in series.

2. The method of claim 1, wherein receiving, adjusting, and relaying are performed sequentially.

3. The method of claim 1, and further comprising:
repeating said communication via a communication port to a successive switch mode power supply, the successive switch mode power supply powering an LED light source comprised of at least one diode and adjusting said second at least one LED light source's output level in response to said communication for a plurality of switch mode power supplies, each successive switch mode power supply communicably coupled to the preceding switch mode power supply.

4. The method of claim 1, wherein the external device is a photosensor.

5. The method of claim 1, wherein the external device is a dimmer.

6. The method of claim 1, wherein the external device is a motion sensor.

* * * * *